(12) United States Patent
Yu et al.

(10) Patent No.: US 12,474,765 B2
(45) Date of Patent: Nov. 18, 2025

(54) HUMAN-MACHINE INTERACTION DEVICE

(71) Applicant: City University of Hong Kong, Kowloon (HK)

(72) Inventors: Xinge Yu, Kowloon (HK); Yiming Liu, Kowloon (HK); Chunki Yiu, Kowloon (HK)

(73) Assignee: City University of Hong Kong, Kowloon (HK)

( * ) Notice: Subject to any disclaimer, the term of this patent is extended or adjusted under 35 U.S.C. 154(b) by 872 days.

(21) Appl. No.: 17/543,973

(22) Filed: Dec. 7, 2021

(65) Prior Publication Data

US 2022/0214741 A1 Jul. 7, 2022

Related U.S. Application Data

(60) Provisional application No. 63/134,667, filed on Jan. 7, 2021.

(51) Int. Cl.
*G06F 3/01* (2006.01)
*G05B 15/02* (2006.01)

(52) U.S. Cl.
CPC .............. *G06F 3/011* (2013.01); *G05B 15/02* (2013.01); *G06F 3/016* (2013.01)

(58) Field of Classification Search
None
See application file for complete search history.

(56) References Cited

U.S. PATENT DOCUMENTS

| | | |
|---|---|---|
| 2013/0204407 A1 | 8/2013 | Bandigowda et al. |
| 2016/0058375 A1* | 3/2016 | Rothkopf ................ G06F 1/163 600/323 |
| 2018/0188850 A1* | 7/2018 | Heath ................... G06F 3/0202 |
| 2019/0369728 A1 | 12/2019 | Rogers et al. |

FOREIGN PATENT DOCUMENTS

CN 106227339 12/2016

* cited by examiner

*Primary Examiner* — Mohammad Ali
*Assistant Examiner* — Saad M Kabir
(74) *Attorney, Agent, or Firm* — Renner, Kenner, Greive, Bobak, Taylor & Weber

(57) ABSTRACT

A human-machine interaction device including a flexible substrate for mounting to a user, a sensing module arranged to sense deformation of the flexible substrate when the flexible substrate is mounted to the user and in response generate a sensed signal, a controller operably connected with the sensing module and arranged to process the sensed signal to obtain a processed signal, and a communication module arranged to communicate the sensed signal or the processed signal to an external electrical device for controlling operation of the external electrical device.

19 Claims, 15 Drawing Sheets

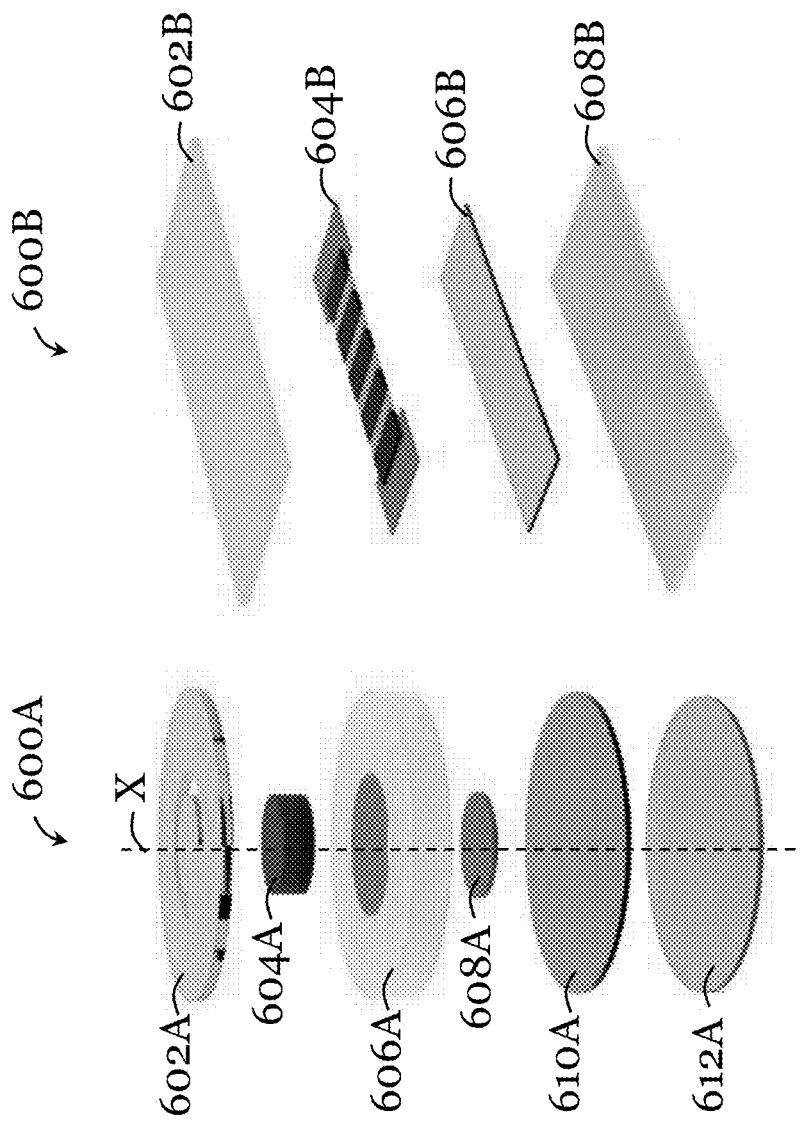

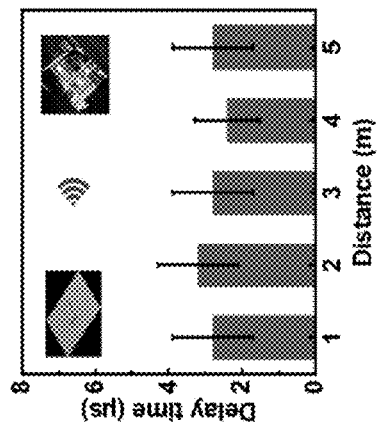
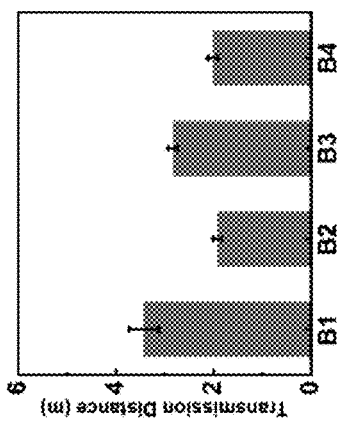
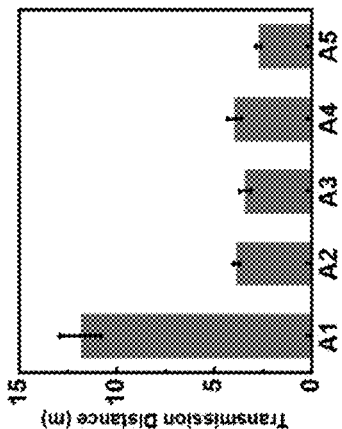
Figure 9A
Figure 9B
Figure 9C

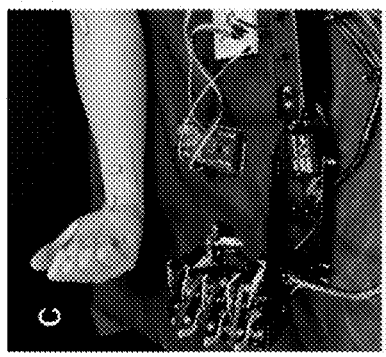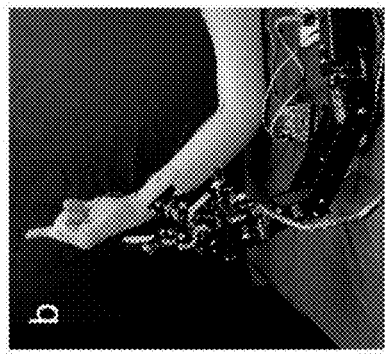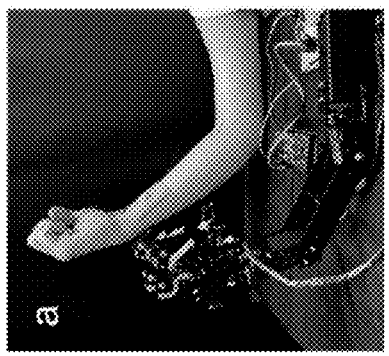

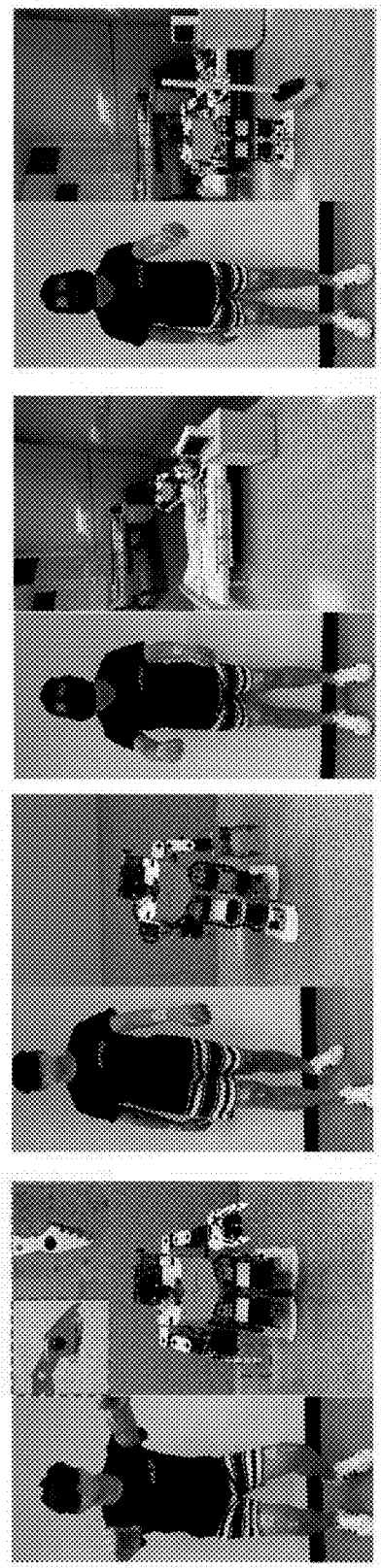

HUMAN-MACHINE INTERACTION DEVICE

TECHNICAL FIELD

The invention relates to a human-machine interaction (HMI) device.

BACKGROUND

Human-machine interaction generally relates to the communication and interaction between a human and a machine (e.g. electrical device) via a user interface. Traditional user interfaces include buttons, actuators, keyboards, and touch sensitive screens. More-recent user interfaces include voice control interfaces, gesture control interfaces, etc. Ideally, the user interface should enable intuitive control of complex machines or machine operations.

SUMMARY

In a first aspect, there is provided a human-machine interaction device. The human-machine interaction device comprises: a flexible substrate for mounting to a user; a sensing module arranged to sense deformation of the flexible substrate when the flexible substrate is mounted to the user and in response generate a sensed signal; a controller operably connected with the sensing module and arranged to process the sensed signal to obtain a processed signal; and a communication module arranged to communicate the sensed signal or the processed signal to an external electrical device for controlling operation (e.g., movement) of the external electrical device. The deformation may include stretching, twisting, and/or bending of the flexible substrate.

The human-machine interaction device is a wearable device arranged to be worn by the user. The human-machine interaction device may be an epidermal human-machine interaction device. The human-machine interaction device may be in direct skin contact with the user or alternatively indirectly attached to the user. The human-machine interaction device may be mounted to one or more joints of the user. The joint may be knuckle joint, wrist joint, carpometacarpal joint, elbow joint, shoulder joint, leg end joint, knee joint, ankle joint, etc.

Optionally, the sensing module comprises one or more sensors arranged to detect change in strain, stress and/or pressure applied to the flexible substrate. The one or more sensors may include strain sensor(s), stress sensor(s), and/or pressure sensor(s). In one example, the sensing module may include two or more strain sensors each arranged to detect change in strain along a respective direction (e.g., respective principal strain axes).

Optionally, the sensing module comprises one or more sensors arranged to detect strain, stress and/or pressure applied to the flexible substrate. The one or more sensors may include strain sensor(s), stress sensor(s), and/or pressure sensor(s). In one example, the sensing module may include two or more strain sensors each arranged to detect strain along a respective direction (e.g., respective principal strain axes).

Optionally, the sensing module comprises a plurality of sensing channels each comprising a piezoresistive sensor. The voltage across the piezoresistive sensor may change based on the deformation. Each of the plurality of sensing channels may further include, at least, a resistor operably connected, e.g., in series, with the piezoresistive sensor. In one example, the piezoresistive sensors are each arranged to detect change of angle of 0-90 degrees and has a sensitivity of 0.025 to 0.030 per degree, e.g., 0.0274 per degree.

Optionally, the sensing module and the controller are in direct, wired connection. The direct, wired connection may be provided by undulating, or wavy, conductor strip(s) or lines(s).

Optionally, the flexible substrate is made of polydimethylsiloxane (PDMS) and/or polyimide (PI). For example, the flexible substrate may include multiple PDMS layers arranged to encapsulate, or at least partly enclose, the components of the human-machine interaction device.

Optionally, the flexible substrate has a color that matches a color of the skin of the user.

Optionally, the controller is arranged to determine, based on the sensed signal, a control command for controlling the external electrical device. The control command may be included in the processed signal. In one example, the controller is arranged to compare the sensed signal with entries in a lookup table to determine the control command corresponding to the sensed signal. The lookup table may include entries of sensed signals and corresponding predetermined control commands (e.g., movement commands). The controller may include a memory and the lookup table may be stored in the memory of the controller.

Optionally, the communication module is further arranged to receive feedback signals from the external electrical device; and the human-machine interaction device further comprises a feedback module operably connected with the controller and arranged to provide feedback to the user based on the received feedback signals when the flexible substrate is mounted to the user.

Optionally, the feedback module and the controller are in direct, wired connection. The direct, wired connection may be provided by undulating, or wavy, conductor strip(s) or lines(s).

Optionally, the feedback module comprises one or more feedback devices arranged to provide haptic feedback to the user.

Optionally, the feedback module comprises a plurality of feedback channels each comprising a vibratory actuator.

Optionally, the feedback signals received from the external electrical device includes pressure information, and the vibratory actuators are arranged to provide haptic feedback with vibration intensity, duration and/or pattern corresponding to the pressure information included in the feedback signals. In one example, the vibratory actuators are each arranged to provide a vibratory amplitude of 0-0.3 mm and a vibratory frequency of 0-250 Hz.

Optionally, each of vibratory actuators include a magnet and a coil controlled to interact with the magnet to induce vibration.

Optionally, the communication module comprises a wireless communication module. The wireless communication module may include one or more of: a cellular (e.g., 3G, 4G, 5G, or above, LTE) communication module, a Wi-Fi™ module, a Bluetooth™ communication module, a ZigBee™ module, an NFC module, an RFID module, etc. In one example, the wireless communication module is a Bluetooth™ communication module.

Optionally, the human-machine interaction device further comprises a power source arranged for powering operation of the human-machine interaction device. In one example, the power source comprises a battery (e.g., a Lithium ion battery).

Optionally, the power source is a rechargeable power source, and the human-machine interaction device further comprises a charging device for charging the rechargeable power source. The charging device may be a wireless charging device. The charging device may include an antenna with a charging coil (e.g., Copper coil). The charging coil may be formed by undulating, or wavy, conductor strips.

Optionally, in top view, the charging coil is arranged around: the sensing module, the controller, and the communication module, and optionally also the power source and the feedback module.

Optionally, the human-machine interaction device further comprises a switch for turning on or off the human-machine interaction device. The switch may be a contact switch or a contactless switch. The switch may take the form of a rotary switch, a slide switch, a toggle switch, etc.

Optionally, the human-machine interaction device further comprises an adhesive layer arranged on the flexible substrate to facilitating mounting of the flexible substrate to the user. The adhesive layer may be an adhesive tape. Optionally, the human-machine interaction device further comprises a release liner, the adhesive layer between arranged between the release liner and the flexible substrate.

Optionally, the human-machine interaction device is in the form of a single patch arranged to be attached (directly or indirectly) to and worn by the user.

Optionally, the sensing module is arranged in or on the flexible substrate. Optionally, the controller is arranged in or on the flexible substrate. Optionally, the communication module is arranged in or on the flexible substrate. Optionally, the communication module is arranged in or on the flexible substrate. Optionally, the feedback module is arranged in or on the flexible substrate. Optionally, the power source is arranged in or on the flexible substrate. Optionally, the charging device is arranged in or on the flexible substrate.

In a second aspect, there is provided a human-machine interaction device comprising: a flexible substrate for mounting to a user; a sensing module arranged to sense deformation of the flexible substrate when the flexible substrate is mounted to the user and in response generate a sensed signal; a controller operably connected with the sensing module and arranged to process the sensed signal to obtain a processed signal; a communication module arranged to communicate the sensed signal or the processed signal to an external electrical device for controlling operation (e.g., movement) of the external electrical device and to receive feedback signals from the external electrical device; and a feedback module operably connected with the controller and arranged to provide haptic feedback to the user based on the received feedback signals when the flexible substrate is mounted to the user. The sensing module, the controller, the communication module, and the feedback module are arranged in or on the flexible substrate. The human-machine interaction device may include one or more other features of the human-machine interaction device of the first aspect.

In a third aspect, there is provided a system comprising a human-machine interaction device and an external electrical device arranged to be operably connected with and controlled by the human-machine interaction device. The human-machine interaction device is the human-machine interaction device of the first aspect or the human-machine interaction device of the second aspect. The external electrical device may be a moveable device, such as a robot, a vehicle (e.g., unmanned vehicle), an aircraft (e.g., unmanned aircraft), a surgical device or tool, etc.

As used herein, the term "machine" in "human-machine interaction" includes machineries and electrical devices such as computers, digital systems, Internet of Things (IoT) devices, vehicles, aircrafts, robots, etc.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which:

FIG. 6A is an exploded schematic diagram of a vibratory actuator in one embodiment of the invention;

FIG. 6B is an exploded schematic diagram of a deformation sensor in one embodiment of the invention;

FIG. 9A is a graph showing different transmission signal transmission distances of a fabricated human-machine interaction device placed at different locations relative to its receiver.

FIG. 9B is a graph showing different transmission signal transmission distances of the human-machine interaction device placed with different orientations relative to its receiver.

FIG. 9C is a graph showing the signal delay time for different distances between the human-machine interaction device and its receiver when they are placed face-to-face;

FIG. 11A is a picture showing a set-up with a 7-degree of freedom (DOF) robotic arm and a human-machine interaction device worn on a user arranged to control the 7-DOF robotic arm in one embodiment of the invention;

FIG. 11B is a picture showing the control of gesture of the 7-DOF robotic arm using the human-machine interaction device;

FIG. 11C is a picture showing the control of gesture of the 7-DOF robotic arm using the human-machine interaction device;

FIG. 11D is a picture showing the control of gesture of the 7-DOF robotic arm using the human-machine interaction device;

FIG. 12B is a picture showing the control of gesture of the 13-DOF robot using the human-machine interaction device;

FIG. 12C is a picture showing the control of gesture of the 13-DOF robot using the human-machine interaction device;

FIG. 12D is a picture showing the control of gesture of the 13-DOF robot using the human-machine interaction device; and FIG. 12E is a picture showing the control of gesture of the 13-DOF robot using the human-machine interaction device.

DETAILED DESCRIPTION

Figure 1:
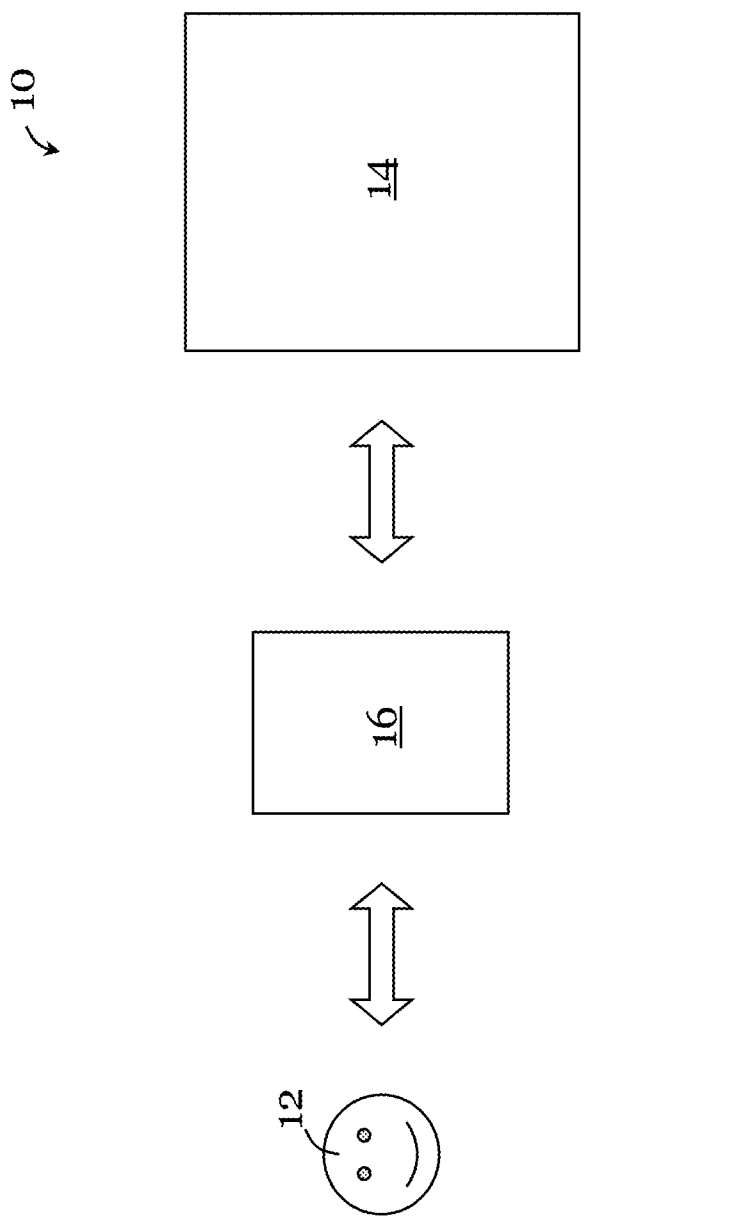
FIG. 1 is a schematic diagram of a human machine interaction environment in one embodiment of the invention.

FIG. 1 shows a human machine interaction environment 10 in one embodiment of the invention. The environment 10 includes a user 12, an electrical device ("machine") 14, and a human-machine interaction device 16 arranged to facilitate interaction of the user 12 with the electrical device 14. The human-machine interaction device 16 may be arranged to enable one-way interaction from the user 12 to the electrical device 14 or two-way interaction between the user 12 and the electrical device 14. The human-machine interaction device 16 may receive an input from the user 12, optionally process it, and then provide it to the electrical device 14 to control operation of the electrical device 14. The human-machine interaction device 16 may further receive an output signal from the electrical device 14, optionally process it, and then provide it to the user 12 to provide a feedback to the user 12. In one example, the human-machine interaction device 16 is arranged to be worn by the user 12. The electrical device 14 may be a movable device such as a robot, a vehicle, an aircraft, a device, or a tool, suitable for use in commercial, domestic, surgical, biomedical, and/or military applications.

Figure 2:
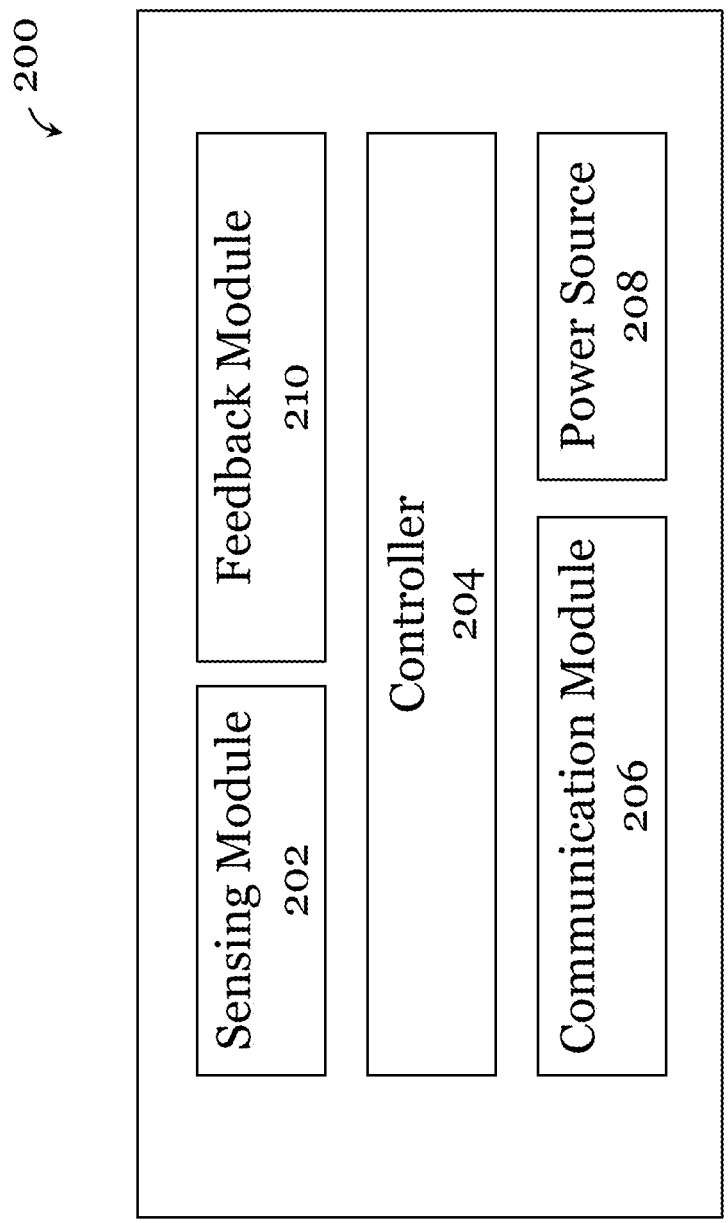
FIG. 2 is a block diagram of a human-machine interaction device in one embodiment of the invention.

FIG. 2 shows various modules of a human-machine interaction device 200. The human-machine interaction device 200 includes a body arranged to hold various components of the human-machine interaction device. In this embodiment, the body is made of a flexible substrate for mounting to or arranged to be worn by a user. The flexible substrate may be made of at least partly of polydimethylsiloxane (PDMS) and/or polyimide (PI). In one example, the flexible substrate may include multiple PDMS layers arranged to encapsulate, or at least partly enclose, the components of the human-machine interaction device. The flexible substrate may have a color that matches a color of the skin of the user.

One component of the human-machine interaction device 200 is a sensing module (or sensing device) 202. The sensing module 202 is arranged to sense deformation (e.g., stretching, twisting, bending) of the flexible substrate and generate a sensed signal. The sensing module 202 may include one or more sensors arranged to detect strain, stress and/or pressure, or change in strain, stress and/or pressure, applied to or associated with the flexible substrate. The sensing module 202 may include two or more strain sensors each arranged to detect strain or change in strain along a respective direction (e.g., respective principal strain axes). In one embodiment, the sensing module 202 includes multiple sensing channels each having a respective piezoresistive sensor. The voltage across the piezoresistive sensor varies based on the deformation (e.g., its extent) of the flexible substrate. Each of the sensing channels may further include a resistor circuit operably connected with the piezoresistive sensor to facilitate detection of the voltage change, which corresponds to the sensed signal.

Another component of the human-machine interaction device 200 is a controller 204. The controller 204 is arranged to process the sensed signal sensed by the sensing module 202 to provide or obtain a processed signal. The controller 204 includes a processor and optionally a memory (storage). The processor may be formed by one or more of: CPU, MCU, controllers, logic circuits, Raspberry Pi chip, digital signal processor (DSP), application-specific integrated circuit (ASIC), Field-Programmable Gate Array (FPGA), or any other digital or analog circuitry configured to interpret and/or to execute program instructions and/or to process signals and/or information and/or data. The memory may include one or more volatile memory (such as RAM, DRAM, SRAM), one or more non-volatile memory (such as ROM, PROM, EPROM, EEPROM, FRAM, MRAM, FLASH, SSD, NAND, and NVDIMM), or any of their combinations. Appropriate computer instructions, commands, codes, information and/or data may be stored in the memory. In one embodiment, the controller 204 is arranged to determine, based on the sensed signal, a control command to be provided to an external electrical device for controlling the external electrical device. The control command (e.g., movement command) may be included in the processed signal. The controller 204 may compare the sensed signal with entries in a lookup table that stores entries of sensed signals and corresponding predetermined control commands to determine the control command corresponding to the sensed signal. In some embodiments in which the controller 204 includes a memory, the lookup table may be stored in the memory of the controller 204.

Another component of the human-machine interaction device 200 is a communication module (or communication device) 206. The communication module 206 is arranged to communicate the sensed signal sensed by the sensing module 202 or the processed signal provided by the controller 204 to an external electrical device for controlling operation (e.g., movement) of the external electrical device. In some embodiments, the communication module 206 communicates the sensed signal sensed by the sensing module 202 to the external electrical device for further processing. In some embodiments, the communication module 206 communicates the processed signal provided by the controller 204 to the external electrical device for further processing. The communication module 206 may establish one or more communication links with the external electrical device. The communication module 206 may include one or more of: a modem, a Network Interface Card (NIC), an integrated network interface, a NFC transceiver, a ZigBee™ transceiver, a Wi-Fi™ transceiver, a Bluetooth™ transceiver, a radio frequency transceiver, an optical port, an infrared port, a USB connection port, or other wired or wireless communication interface(s). The transceiver may be implemented by one or more devices (integrated transmitter(s) and receiver(s), separate transmitter(s) and receiver(s), etc.). The communication link(s) may be wired or wireless for communicating commands, instructions, information, and/or data. In one embodiment, the communication module 206 is a wireless communication module that includes one or more of: a cellular (e.g., 3G, 4G, 5G, or above, LTE) communication module, a Wi-Fi™ module, a Bluetooth™ communication module, a ZigBee™ module, an NFC module, an RFID module, etc. The communication module 206 may be further arranged to receive feedback signals from the external electrical device.

Another component of the human-machine interaction device 200 is a power source 208. The power source 208 is arranged to provide power for powering operation of the components of the human-machine interaction device 200. The power source 208 can be a DC power source (e.g., battery) or an AC power source (e.g., AC mains). The power source 208 may include be a recharge battery that can be charged through wires or wirelessly. In one example, the rechargeable battery includes a Lithium (Li) ion battery.

Another component of the human-machine interaction device 200 is a feedback module (or feedback device) 210. The feedback module 210 is arranged to provide feedback to the user based on the feedback signals received from the external electrical device by the communication module 206. The feedback module 210 may include one or more feedback devices arranged to provide haptic feedback to the user. In one embodiment, the feedback module 210 includes multiple feedback channels each having a vibratory actuator. In one embodiment, the vibratory actuators can provide tactile feedback of variable vibration intensity, duration and/or pattern to the user. For example, if the feedback signals received from the external electrical device includes pressure or force information, the vibratory actuators can provide haptic feedback with vibration intensity, duration and/or pattern corresponding to the pressure or force information included in the feedback signals. In another example, the controller 204 may analyze the feedback signals or compare the feedback signals with entries in a lookup table that stores entries of feedback signals and corresponding predetermined haptic feedback (vibration intensity, duration and/or pattern) to determine the control signal to be provided to the vibratory actuators. In some embodiments in which the controller 204 includes a memory, the lookup table may be stored in the memory of the controller 204.

The sensing module 202, the controller 204, the communication module 206, the power source 208, and the feedback module 210, are arranged to be in data and/or power connection with each other. For example, these components may be connected with each other through one or more conductors or buses. The conductors or buses may be undulating, or wavy, to adapt to the deformation of the flexible substrate without breaking. One or more or all of the sensing module 202, the controller 204, the communication module 206, the power source 208, and the feedback module 210 may be arranged in or on the flexible substrate. In one implementation, the sensing module 202, the controller 204, and the feedback module 210 are hard-wired together. For example, each of the sensing module 202 and the feedback module 210 are in direct wired connection with the controller 204.

The human-machine interaction device 200 may include other components. In some embodiments in which the power source is rechargeable, the human-machine interaction device 200 further includes a charging device for charging the rechargeable power source. The charging device may include an antenna with a charging coil arranged to wirelessly receive charging power from an external charger to charge or power the power source. The charging coil may be arranged to surround the components of the human-machine interaction device 200 for improved charging efficiency. Additionally or alternatively, the human-machine interaction device 200 may include an on/off switch. Additionally or alternatively, the human-machine interaction device 200 further comprises an adhesive layer (e.g., adhesive type, gel, etc.) arranged on the flexible substrate to facilitating mounting of the flexible substrate to the user, and a release liner that protects or hides the adhesive layer prior to use of the human-machine interaction device 200 (the adhesive layer is arranged between the flexible substrate and the release liner).

In one implementation, the human-machine interaction device 200 is a wearable device, in the form of a patch, arranged to be worn by the user. The human-machine interaction device 200 may be an epidermal human-machine interaction device, which may be arranged to be in direct skin contact with the user or otherwise indirectly attached to the user. The human-machine interaction device 200 may be mounted to a joint of the user (e.g., knuckle joint, wrist joint, carpometacarpal joint, elbow joint, shoulder joint, leg end joint, knee joint, ankle joint, etc.) to detect the user's movement. The external electrical device controlled by the human-machine interaction device 200 may be a moveable device, such as a robot, a vehicle (e.g., unmanned vehicle), an aircraft (e.g., unmanned aircraft), a surgical device or tool.

Figure 3:
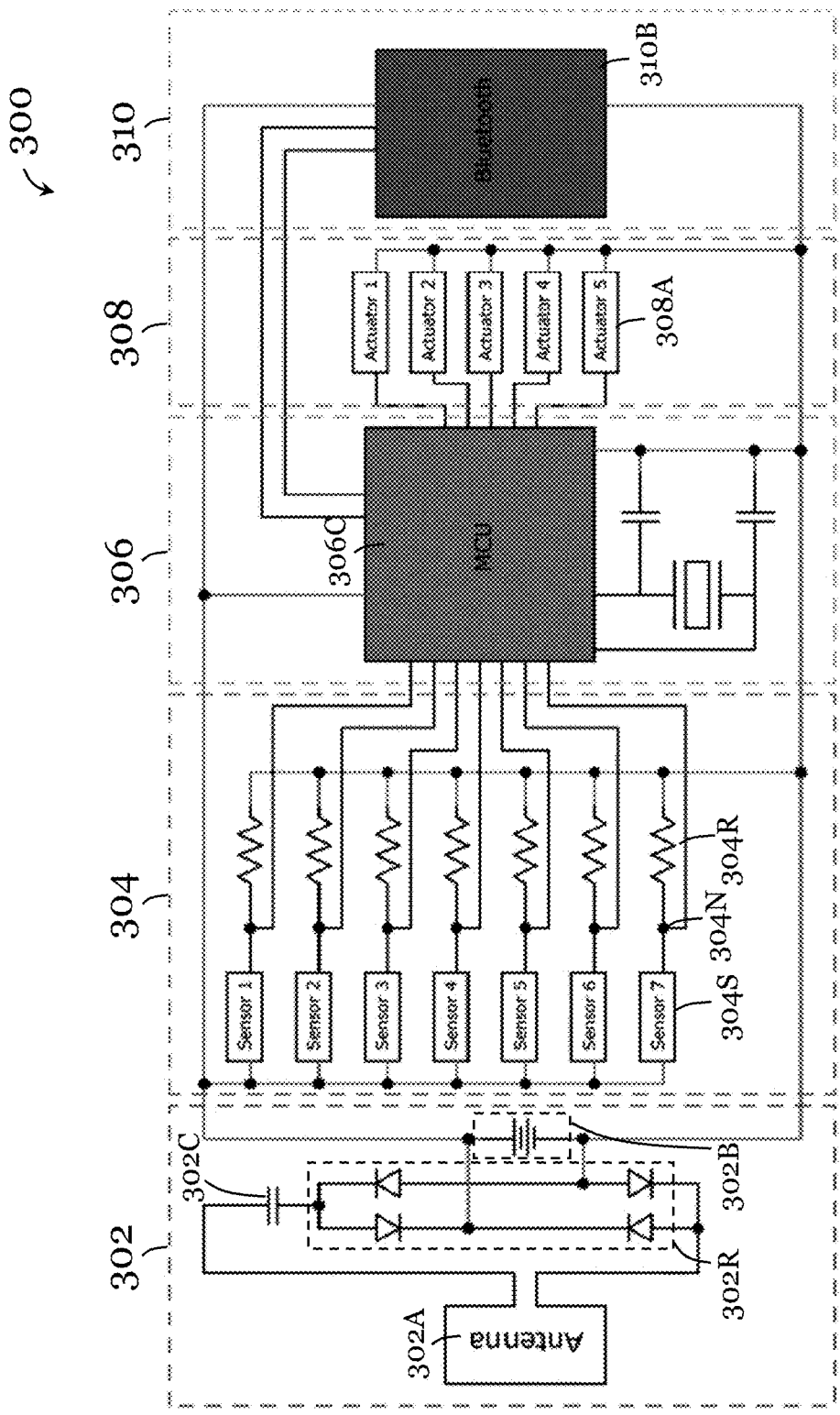
FIG. 3 is a circuit diagram of an electrical circuit of a human-machine interaction device in one embodiment of the invention.

FIG. 3 shows an electrical circuit 300 of a human-machine interaction device in one embodiment of the invention. The electrical circuit 300 may be at least partly arranged in or on a flexible substrate, such as one made by PDMS and/or PI. As shown in FIG. 3, the electrical circuit 300 includes a power management circuit 302, a sensor circuit 304, a data processing circuit 306, a feedback circuit 308, and a communication circuit 310.

The power management circuit 302 includes a battery 302B, an antenna 302A, and a rectifier circuit 302R (e.g., diode bridge) arranged between the antenna 302A and the battery 302B. The battery 302B is a Li-ion battery arranged to provide power to the sensor circuit 304, the data processing circuit 306, the feedback circuit 308, and the communication circuit 310 to power their operation. The antenna is provided by a coil and is arranged to operate as a wireless charging interface for receiving power from an external wireless charger to charge or power the battery. The power management circuit 302 also includes a capacitor 302C connected in series with the rectifier circuit 302R, with the capacitor 302C and the rectifier circuit 302R connected across the antenna 302A. The capacitor 302C is arranged to affect a resonant frequency of the antenna. In this example, the antenna 302A has a resonant frequency of 13.56 MHz, which is compatible with cellphone communication. The power management circuit 302 may further include an on/off switch connected in series with the battery 302B.

The sensor circuit 304 includes 7 sensing channels connected between the battery 302B and the data processing circuit 306. The 7 sensing channels are arranged in parallel. Each of the sensing channel includes a piezoresistive sensor 304S and a resistor 304R connected in series with the piezoresistive sensor 304S. The piezoresistive sensor 304S and the resistor 304R are connected across the high potential and low potential power lines. The piezoresistive sensors 304S may be mounted onto joints of the human body (e.g., the user's body) to sense human body motion hence deformation of the flexible substrate and to convert the sensed deformation into electrical signals. The resistor 304R facilitates reading out of a voltage change across the piezoresistive sensor 304S, e.g., induced by deformation of the flexible substrate. The piezoresistive sensors 304S may operate as strain or pressure sensors. In each sensing channel, between the piezoresistive sensors 304S and the resistor 304R is a node for connection with the data processing circuit 306. The piezoresistive sensors 304S are in direct wired connection with the data processing circuit 306.

The data processing circuit 306 includes an MCU 306C. In this embodiment, the MCU 306C includes a processor and a memory, and is arranged to operate as a controller controlling operation of the circuit 300. The MCU 306C is in direct wired connection with the piezoresistive sensors 304S and is in direct wired connection with the feedback circuit 308, The feedback circuit 308 includes 5 feedback channels connected between the MCU 306C and the communication circuit 310. The 5 feedback channels are arranged in parallel. Each of the feedback channel includes a vibratory actuator 308A arranged to provide tactile or haptic feedback to the user. The intensity, duration, and/or pattern of vibrations provided by the actuators 308A are controlled by the MCU 306C.

The communication circuit 310 includes a Bluetooth™ communication module 310B arranged to communicate with an external electrical device using Bluetooth™ communication link(s). The Bluetooth™ communication module 310B is arranged to be directly connected to the MCU 306C.

In operation, when the flexible substrate on or in which the circuit 300 is arranged is mechanically deformed (stretched, twisted, bent), voltage across respective piezoresistive sensors 304S of the sensor circuit 304 change, and this voltage change is detected and processed by the MCU 306C. The MCU 306C detects the sensed signals, processes them, and transmits the processed signals to the Bluetooth™ communication module 310B for communicating the processed signals to the external electrical device to control its operation. In one example, the MCU 306C processes the sensed signals by comparing the sensed signal with entries in a lookup table to determine a control command corresponding to the sensed signal, and incorporates the control command into the processed signal to be sent to the external electrical device. In some embodiments, the external electrical device may provide feedback signals to the Bluetooth™ communication module 310B, in which case the feedback signals will be processed by the MCU 306C. The MCU 306C then provides control signals to the vibratory actuators 308A to actuate them, so as to provide some feedback to the user. In one example, the MCU 306C compares the feedback signals with entries in a lookup table that stores entries of feedback signals and corresponding predetermined haptic feedback (vibration intensity, duration and/or pattern) to determine the control signal to be provided to the vibratory actuators.

Figure 4A:
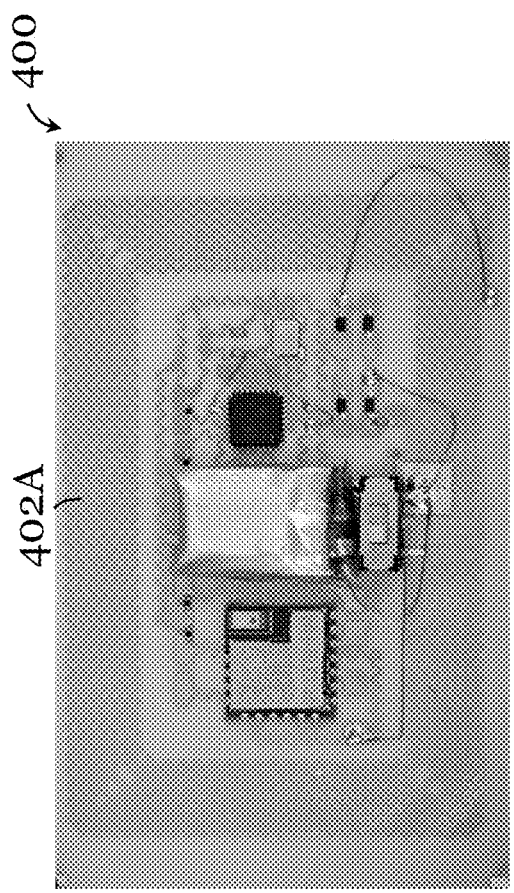
FIG. 4A is a photo of a human-machine interaction device in one embodiment of the invention.

FIG. 4A is a prototype of a human-machine interaction device 400 in one embodiment of the invention. In this illustration, the human-machine interaction device 400 includes a flexible substrate and a circuit 300 of FIG. 3 mounted to the flexible substrate. As shown in FIG. 4A, in top view, the antenna coil 402A is generally arranged around the other components of the human-machine interaction device 400.

Figure 4B:
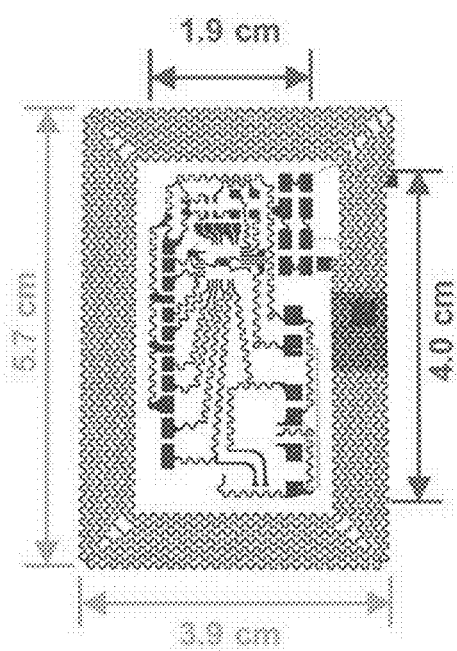
FIG. 4B is a schematic diagram of the circuit of the human-machine interaction device of FIG. 4A.

FIG. 4B shows the circuit connections of the human-machine interaction device 400. The circuit connections include conductor strips or lines. The conductor strips or lines are undulating or wavy such that they can withstand a certain degree of deformation (as the flexible substrate is mechanically deformed).

Figure 5:
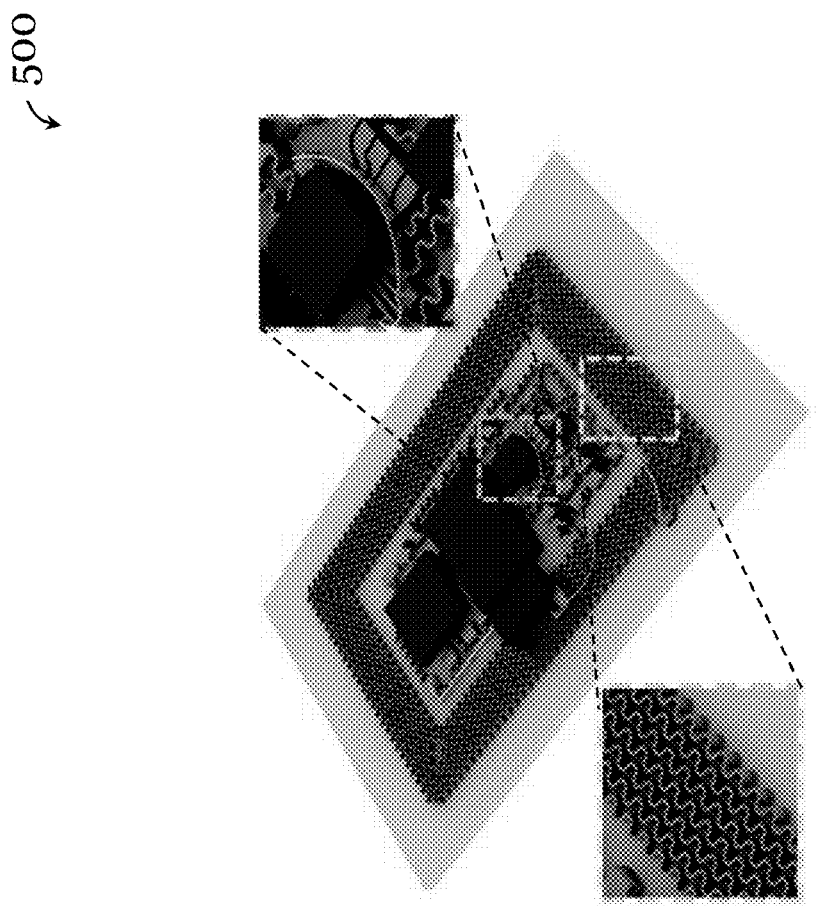
FIG. 5 is a schematic diagram of a circuit of a human-machine interaction device in one embodiment of the invention.

FIG. 5 shows a modelled circuit 500 of a human-machine interaction device substantially the same as the human-machine interaction device 400 of FIG. 4. The enlarged views of two portions of the modelled circuit 500 show part of the antenna coil (left) and the MCU (right).

FIG. 6A shows a vibratory actuator 600A in one embodiment of the invention. The vibratory actuator 600A can be used as the vibratory actuator (feedback device) in the embodiments of FIGS. 2 to 5, among other embodiments. The vibratory actuator 600A operates based on electromagnet effect. The vibratory actuator 600A includes an annular ring member 606A with the top annular surface attached to a polyethylene terephthalate (PET) layer 602A and the bottom annular surface attached to a PDMS layer 610A. The annular ring member 606A may be non-conductive. The bottom surface of the PDMS layer 610A (opposite the surface attached to the ring) includes an adhesive layer 612A arranged to be attached to a user or an object. In this example the annular ring member 606A, the terephthalate (PET) layer 602A, the PDMS layer 610A, and the adhesive layer 612A are coaxial with respect to axis X. A coil 608A and a magnet 604A is arranged in the central hole of the annular ring member. The coil 608A may be connected with a controller through conductor wires or lines. The controller may control the current to the coil 608A to control the vibration generated by the magnet 604A due to electromagnetic interaction between the coil 608A and the magnet 604A. In one example, the controller may provide pulsed current with variable frequencies ranging from 0 Hz to 250 Hz to the coil 608A to control vibration intensity of the magnet 604A. In one embodiment, the vibratory actuator 600A has an overall size of 7 mm diameter and 1.9 mm thickness. In one embodiment the vibration amplitude can increase from 0 mm to 0.3 mm when the frequency increases from 0 Hz to 250 Hz.

FIG. 6B shows a deformation sensor 600B in one embodiment of the invention. The strain sensor 600B can be used as the sensor in the embodiments of FIGS. 2 to 5, among other embodiments, to detect deformation of the flexible substrate. The deformation sensor 600B may also be mounted onto an external electrical device (a robot) and operate as a pressure sensor to provide feedback information. The deformation sensor 600B includes top and bottom PDMS layers 602B, 608B, with a piezoresistive element 604 and a PI layer 606B arranged between the top and bottom PDMS layers 602B, 608B. In one embodiment, the deformation sensor 600B has a length of 30 mm, a width of 10 mm, and a thickness of 1.8 mm. The deformation sensor 600B may be mounted onto human joints, including knuckle, wrist, elbow, shoulder, leg end, knee, ankle joints, to detect deformation or movement associated with these joints. In one example, the deformation sensor 600B can be used to detect bending, to support a wide detection angle range from o degree to 90 degrees with a high sensitivity of 0.0274 per degrees.

A human-machine interaction device in accordance with the above designs in FIGS. 3 to 5 was fabricated. The fabricated human-machine interaction device, with the communication module of the electrical circuit 300 of FIG. 3 mounted at/near its top surface, when mounted to a user's tummy, can communicate with an external electrical device with the same type of Bluetooth™ communication module mounted at/near its corresponding top surface, with a transmission distance of 4 m. It is found that the transmission distance decreased to 2 m when the human-machine interaction device and the corresponding receiver (of the external electrical device) are placed side-by-side with the top surface of the human-machine interaction device and the top surface of the external electrical device both facing upwards. The delay time between the transmitter and receiver (the two communication modules) can be decreased to 2 μs, which is beyond the human perception. The communication module of the human-machine interaction device may be in communication with a computer, or like information handling system, to extend the data transmission range of the human-machine interaction device. It was also found that the thickness of the encapsulation layer (PDMS) enclosing the Bluetooth™ communication module of the human-machine interaction device affects the communication performance. By optimizing the thickness of the PDMS layer on the top of the Bluetooth™ communication module of the human-machine interaction device, the transmission distance between human-machine interaction device and the correspond receiver (of the external electrical device) was extended from 1.32 m to 2.96 m (with the human-machine interaction device mounted onto a human arm in a face-to-face arrangement with the external electrical device). The electrical characteristics of the battery, including its operation time, stand-by time, and wireless charging time, were studied. It was found that the human-machine interaction device could continuously operate for over 240 minutes (without operating the actuators), and can operate over 20 minutes for the full load operation. The battery can maintain a stable voltage, which varies from 4.081 V to 4.062 V in 334 h. The wireless charging means can charge the battery from 3V to 4V in about 35 mins as the coupled coil (diameter of 2 cm; 10 cycles; 1Ω resistance) can provide high power (41 W) with a frequency of 13.56 MHz. The encapsulation layer is made as a skin-color encapsulation layer which makes the device visually less prominent (and perhaps more aesthetically pleasing) when worn by the user.

Figure 7C:
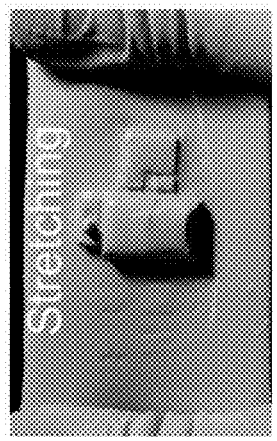
FIG. 7C is a picture showing stretching of the human-machine interaction device of FIG. 7A.
Figure 7B:
FIG. 7B is a picture showing bending of the human-machine interaction device of FIG. 7A.
Figure 7A:
FIG. 7A is a picture showing twisting of a fabricated human-machine interaction device in one embodiment of the invention.

FIGS. 7A to 7C illustrate deformation of the fabricated human-machine interaction device. The fabricated human-machine interaction device is based on the device 400 in FIG. 4 but includes an additional encapsulation layer (e.g., PDMS layer) arranged on the device 400 to enclose or encapsulate the device components. In this example the fabricated human-machine interaction device has a length of 70 mm, a width of 50 mm, and a thickness of 2 mm. FIG. 7A shows the fabricated human-machine interaction device being twisted. FIG. 7B shows the fabricated human-machine interaction device being bent. FIG. 7C shows the fabricated human-machine interaction device being stretched. In these three cases, the fabricated human-machine interaction device can operate normally under the deformation.

Figure 8A:
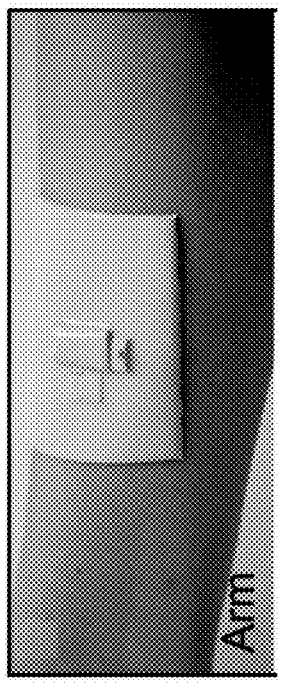
FIG. 8A is a picture showing a fabricated human-machine interaction device in one embodiment of the invention mounted to an arm of a user.
Figure 8B:
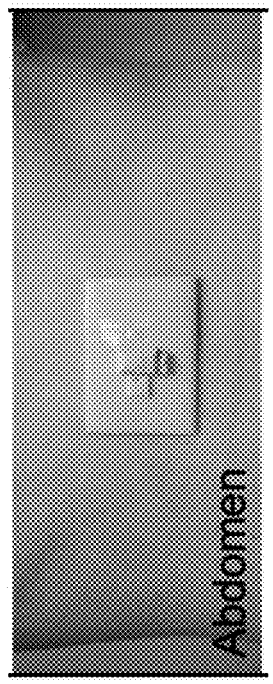
FIG. 8B is a picture showing the fabricated human-machine interaction device mounted to an abdomen of a user.
Figure 8C:
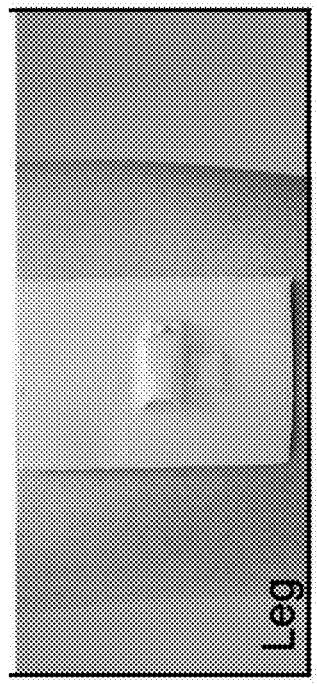
FIG. 8C is a picture showing the fabricated human-machine interaction device mounted to a leg of a user.

FIGS. 8A to 8C illustrate the mounting of the fabricated human-machine interaction device to the user's arm (FIG. 8A), the user's abdomen (FIG. 8B), and the user's leg (FIG. 8C) respective.

FIG. 9A shows different transmission signal transmission distances of the fabricated human-machine interaction device placed at different locations relative to its receiver (of the external electrical device). In all of A1 to A5, the human-machine interaction device and the receiver are placed face-to-face (i.e., the communication module near/at the top surface of the human-machine interaction device directly facing the communication module/receiver near/at the top surface of the external electrical device). In A1, the human-machine interaction device is arranged far away from human body, and the average transmission distance is above 10 m. In A2, the human-machine interaction device is mounted to the back of a hand of a user. In A3, the human-machine interaction device is mounted to the forearm of the user. In A4, the human-machine interaction device is mounted to the tummy of the user. In A5, the human-machine interaction device is mounted to a knee of the user. In A2 to A5, the average transmission distance is about 2.5 m to 5 m.

FIG. 9B shows different transmission signal transmission distances of the human-machine interaction device placed with different orientations relative to its receiver (of the external electrical device). In all of B1 to B4, the human-machine interaction device is mounted to a forearm of a user. In B1, the human-machine interaction device and the receiver are mounted face-to-face (i.e., the communication module near/at the top surface of the human-machine interaction device directly facing the communication module/receiver near/at the top surface of the external electrical device). In B2, the human-machine interaction device and the receiver are mounted side-by-side (i.e., the communication module near/at the top surface of the human-machine interaction device and the communication module/receiver near/at the top surface of the external electrical device both face upwards towards the ceiling/sky). In B3, the human-machine interaction device and the receiver are mounted face-to-back (i.e., the communication module near/at the top surface of the human-machine interaction device directly facing the bottom surface of the external electrical device). In B4, the human-machine interaction device and the receiver are mounted back-to-back. (i.e., the bottom surface of the human-machine interaction device directly facing the bottom surface of the external electrical device). The average transmission distances in B1 to B4 is in the range of about 2 m to about 4 m, with the average transmission distances in B2 and B4 lower than average transmission distances in B1 and B3.

FIG. 9C shows the signal delay time for different distances between the human-machine interaction device and its receiver (of the external electrical device) when they are placed face-to-face. As seen from FIG. 9C, the average delay time for 1 m to 5 m in the range of about 2 μs to about 3.5 μs.

Figures 9D, 9E, 9F:
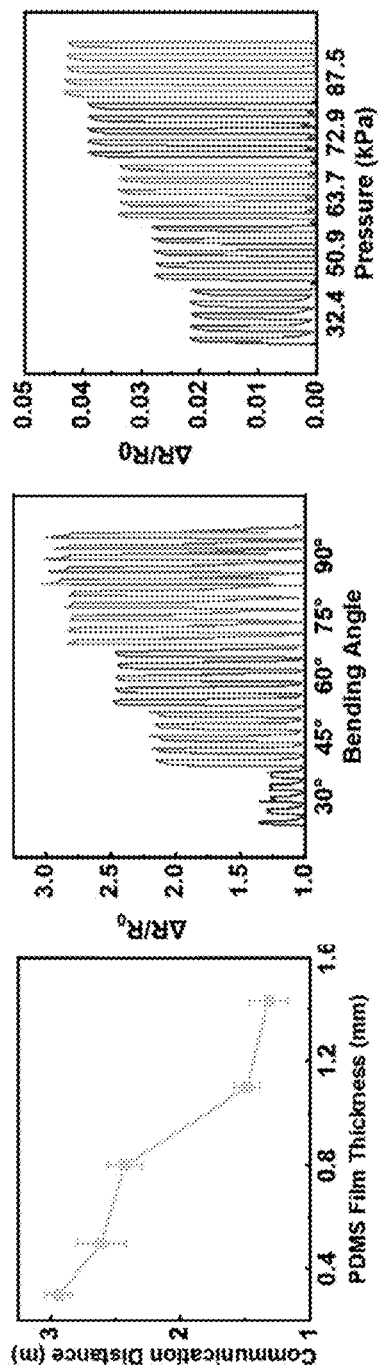
FIG. 9D is a graph showing the signal communication distance between the human-machine interaction device and its receiver when they are placed face-to-face for different thickness of the PDMS film of the human-machine interaction device.
FIG. 9E is a graph showing the electrical signals of the sensing module of the human-machine interaction device at different bending angles.
FIG. 9F is a graph showing the electrical signals of the sensing module of the external electrical device at different applied pressures.

FIG. 9D shows the signal communication distance between the human-machine interaction device and its receiver (of the external electrical device) when they are placed face-to-face for different thickness of the PDMS film of the human-machine interaction device. As seen from FIG. 9D, the thicker the film the shorter the communication distance.

FIG. 9E shows the electrical signals of the sensing module of the human-machine interaction device at different bending angles (e.g., when the human-machine interaction device, or its sensing module, is bent). The signals are at a substantially constant frequency of 1 kHz.

FIG. 9F shows the electrical signals of the sensing module of the external electrical device at different applied pressures (e.g., when the external electrical device, or its sensing module, is subjected to pressure change). The signals are at a substantially constant frequency of 1 kHz.

Figures 9G, 9H, 9I:
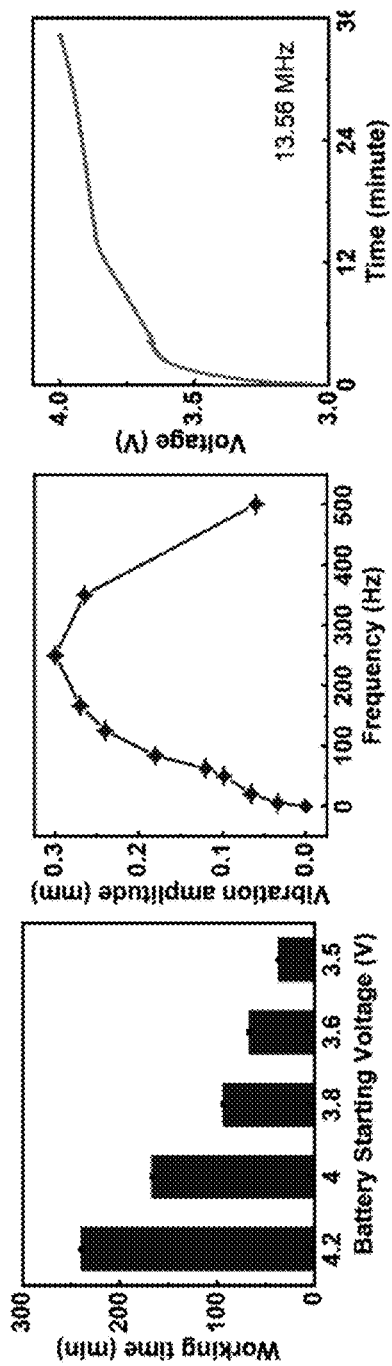
FIG. 9G is a graph showing the full load operation time of the human-machine interaction device (without tactile feedback) at different initial battery voltages.
FIG. 9H is a graph showing the vibration amplitude of the vibratory actuator as a function of frequency of current applied at a contact voltage 1.67V and duty cycle 10%.
FIG. 9I is a graph showing voltage of the battery as a function of time when the human-machine interaction device is wirelessly charged at a constant power of 41 W and a frequency of 13.56 MHz.

FIG. 9G shows the full load operation time of the human-machine interaction device (without tactile feedback) at different initial battery voltages. As shown in FIG. 9G, at 4.2V initial battery voltage, the operation time can be over 240 minutes. The lower the initial battery voltage, the shorter the operation time.

FIG. 9H shows the vibration amplitude of the vibratory actuator of the human-machine interaction device as a function of frequency of current applied to the coil of the vibratory actuator, at a contact voltage 1.67V and duty cycle 10%. The resonance frequency is about 250 Hz, with a vibration amplitude of 0.3 mm.

FIG. 9I shows voltage of the battery as a function of time when the human-machine interaction device is wirelessly charged at a constant power of 41 W and a frequency of 13.56 MHz.

Further human-machine interaction devices in accordance with the above designs were fabricated and applied in human-machine interaction applications.

Figure 10A:
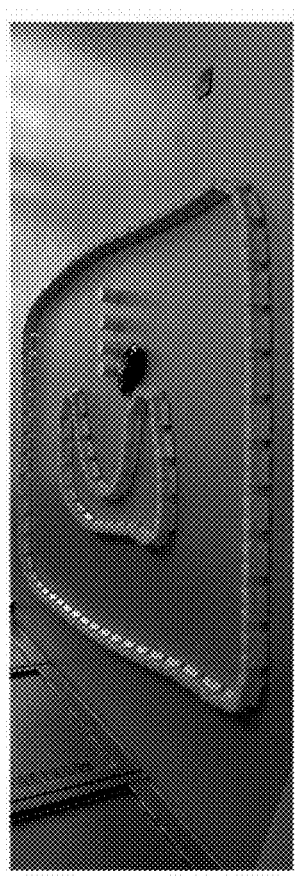
FIG. 10A is a picture showing a set-up with a tele-car arranged to be controlled by a human-machine interaction device in one embodiment of the invention.
Figure 10B:
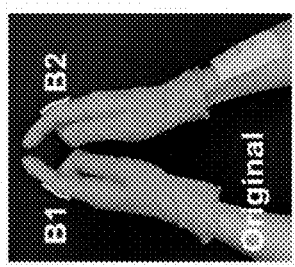
FIG. 10B is a picture showing the human-machine interaction device worn on a user arranged to control the tele-car in the set-up of FIG. 10A.
Figure 10C:
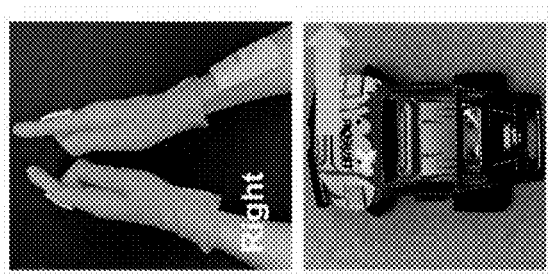
FIG. 10C is a picture showing the control of right movement of the tele-car in the set-up of FIG. 10A using the human-machine interaction device.
Figure 10D:
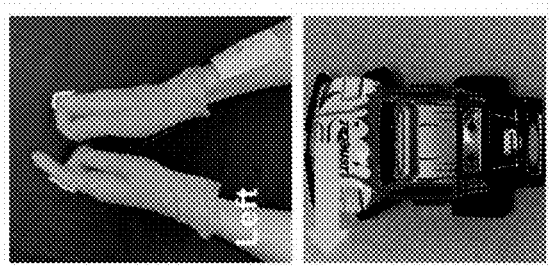
FIG. 10D is a picture showing the control of left movement of the tele-car in the set-up of FIG. 10A using the human-machine interaction device.
Figure 10E:
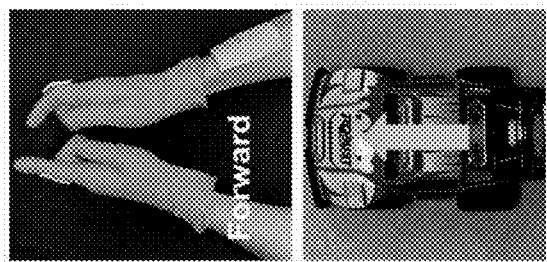
FIG. 10E is a picture showing the control of forward movement of the tele-car in the set-up of FIG. 10A using the human-machine interaction device.
Figure 10F:
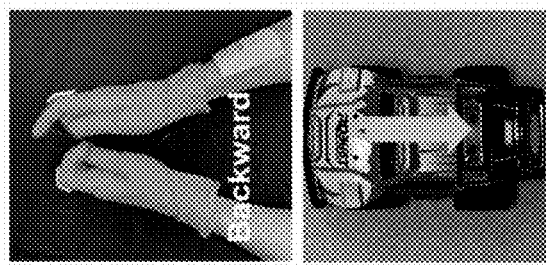
FIG. 10F is a picture showing the control of backward movement of the tele-car in the set-up of FIG. 10A using the human-machine interaction device.

FIG. 10A is a set-up with a track and a tele-car arranged in the track and arranged to be controlled by a human-machine interaction device in one embodiment of the invention. FIG. 10B shows two human-machine interaction devices each worn on a respective hand of the user. FIG. 10C illustrates the movement required by the user controlling the human-machine interaction device to move the tele-car to the right. FIG. 10D illustrates the movement required by the user controlling the human-machine interaction device to move the tele-car to the left. FIG. 10E illustrates the movement required by the user controlling the human-machine interaction device to move the tele-car forward. FIG. 10F illustrates the movement required by the user controlling the human-machine interaction device to move the tele-car backward.

FIG. 11A is a set-up with a 7-degree of freedom (DOF) robotic arm and a human-machine interaction device worn on a user arranged to control the 7-DOF robotic arm in one embodiment of the invention. FIG. 11B shows movement of the 7-DOF robotic arm in accordance with movement of the user's finger. FIG. 11C shows movement of the 7-DOF robotic arm in accordance with the user clinching his/her fist. FIG. 11D shows movement of the 7-DOF robotic arm in accordance with the user's movement to facilitate oral sampling.

Figure 12A:
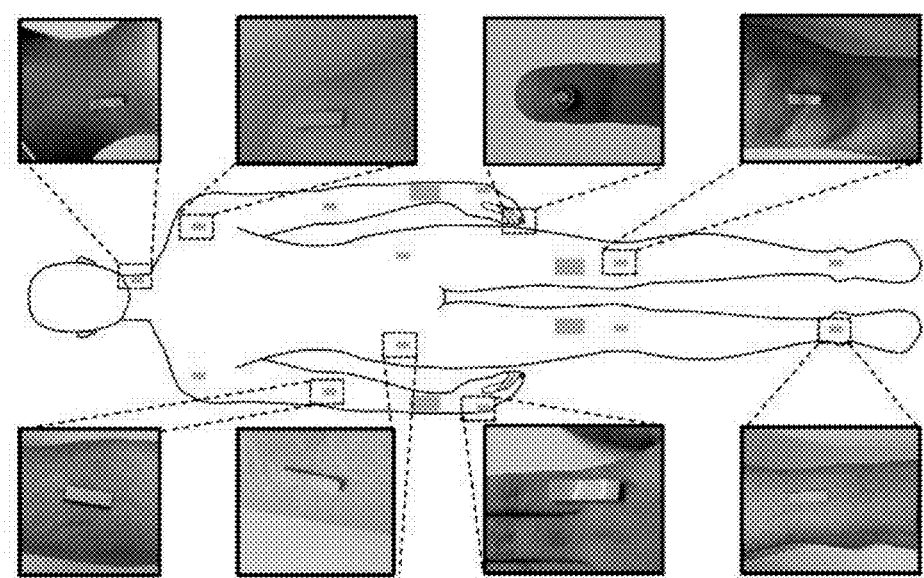
FIG. 12A is a picture showing the wearing of human-machine interaction devices on a user's body for controlling a 13-DOF robot.

FIG. 12A shows the wearing of human-machine interaction devices on a user's body for controlling a 13-DOF robot. FIGS. 12B to 12E illustrate various controls of gesture of the 13-DOF robot by the user wearing the human-machine interaction devices.

The invention has provided a human-machine interaction device is particularly suitable for (but not limited to) use as interface between human users and movable electrical devices (e.g., movable machines, robots, vehicles, aircrafts, etc.). The human-machine interaction device enables users to remotely manipulate various movable or robotic devices, including but not limited to driverless vehicles, complicated robots, etc. Some embodiments of the human-machine interaction device further offers a tactile (force) feedback to enhance the interactivity between the human user and electrical device. The human-machine interaction device can be mounted onto human skin without causing irritation to the skin, hence is easy and intuitive to carry and manipulate for controlling an external "machine".

The human-machine interaction devices of the embodiments of the invention can be used in various applications such as in the commercial, biomedical, and military fields. In one commercial application, the human-machine interaction device can be used to control movement of an unmanned car even when the user is away from the vehicle. In another commercial application, the human-machine interaction device can be used by pilots to control movement of aircrafts. The human-machine interaction device could be used by injured or disabled user. For example, a user with hand disability or injury can remotely manipulate a robot to carry heavy goods through the human-machine interaction device. In one biomedical engineering application, the human-machine interaction device could be worn or otherwise carried by doctors to remotely control a surgical or therapeutic robot to perform surgery or therapy. In another biomedical engineering application, the human-machine interaction device could be worn or otherwise carried by medical workers to perform nasal and throat swabs, with the medical workers away from the potentially infected patients or persons. In one military application, the human-machine interaction device could be used to remotely control a device to defuse a bomb.

It will be appreciated by persons skilled in the art that numerous variations and/or modifications may be made to the invention as shown in the specific embodiments to provide other embodiments of the invention. The feature(s) of the human-machine interaction device 200 and the feature(s) of the circuit 300 may be selectively combined, or modified, to provide other human-machine interaction device embodiments. The described embodiments of the invention should therefore be considered in all respects as illustrative and not restrictive.

For example, the human-machine interaction device may be arranged in a distributive manner such that different electronic components are arranged on two or more different devices operably connected with each other. In some embodiments, the human-machine interaction device may include no feedback module, no charging circuit, no integrated power source, etc. The feedback module may provide visual and/or audible feedback, in place of or in addition to tactile feedback.

The invention claimed is:

1. A human-machine interaction device for controlling movement of an external movable device, comprising:
    a flexible substrate configured to be mounted to a joint of a user;

a sensing module comprising two or more strain sensors, each arranged to detect strain or change in strain along a respective principal strain axis of the joint when the flexible substrate is mounted to the joint of the user, wherein the sensing module is further configured to generate a sensed signal indicative of the user's movement in response to a voluntary movement associated with the joint of the user;

a controller operably connected with the sensing module and arranged to process the sensed signal to obtain a processed signal; and a communication module operably connected to at least one of the sensing module and the controller, arranged to communicate the sensed signal or the processed signal to the external movable device for controlling movement of the external movable device in accordance with the voluntary movement of the joint of the user;

wherein the sensing module, the controller, and the communication module are arranged in or on the flexible substrate;

wherein the external movable device comprises any one of a robot, a teleoperated vehicle, a vehicle, an aircraft, and a surgical device.

2. The human-machine interaction device of claim 1, wherein the sensing module further comprises one or more stress sensors or pressure sensors arranged to detect change in at least one of, stress and pressure applied to the flexible substrate.

3. The human-machine interaction device of claim 1, wherein the sensing module comprises a plurality of sensing channels each comprising a piezoresistive sensor.

4. The human-machine interaction device of claim 1, wherein the flexible substrate is made of at least one of polydimethylsiloxane (PDMS) and polyimide (PI).

5. The human-machine interaction device of claim 1, wherein the controller is arranged to determine, based on the sensed signal, a control command for controlling the external movable device, and wherein the control command is included in the processed signal.

6. The human-machine interaction device of claim 1, wherein the communication module is further arranged to receive feedback signals from the external movable device; and wherein the human-machine interaction device further comprises a feedback module operably connected with the controller and arranged to provide feedback to the user based on the received feedback signals when the flexible substrate is mounted to the user;

wherein the feedback module is arranged in or on the flexible substrate.

7. The human-machine interaction device of claim 6, wherein the sensing module and the controller are in direct, wired connection; and wherein the feedback module and the controller are in direct, wired connection.

8. The human-machine interaction device of claim 6, wherein the feedback module comprises one or more feedback devices arranged to provide haptic feedback to the user.

9. The human-machine interaction device of claim 6, wherein the feedback module comprises a plurality of feedback channels each comprising a vibratory actuator.

10. The human-machine interaction device of claim 9, wherein the feedback signals received from the external movable device includes pressure information; and wherein the vibratory actuators are arranged to provide haptic feedback with at least one of vibration intensity, duration and pattern corresponding to the pressure information included in the feedback signals.

11. The human-machine interaction device of claim 1, wherein the communication module comprises a wireless communication module.

12. The human-machine interaction device of claim 1, further comprising a power source arranged in or on the flexible substrate for powering operation of the human-machine interaction device.

13. The human-machine interaction device of claim 12, wherein the power source is a rechargeable power source; and wherein the human-machine interaction device further comprises a charging device arranged in or on the flexible substrate for charging the rechargeable power source.

14. The human-machine interaction device of claim 13, wherein the charging device comprises a charging coil.

15. The human-machine interaction device of claim 14, wherein, in a plan view, the charging coil is arranged around the sensing module, the controller, and the communication module.

16. The human-machine interaction device of claim 1, further comprising an adhesive layer arranged on the flexible substrate to facilitating mounting of the flexible substrate to the user.

17. The human-machine interaction device of claim 1, wherein the human-machine interaction device is in the form of a patch arranged to be worn by the user.

18. A human-machine interaction device for controlling movement of an external movable device, comprising:

a flexible substrate configured to be mounted to a joint of a user;

a sensing module comprising two or more strain sensors, each arranged to detect strain or change in strain along a respective principal strain axis of the joint when the flexible substrate is mounted to the joint of the user, wherein the sensing module is further configured to generate a sensed signal indicative of the user's movement in response to a voluntary movement associated with the joint of the user;

a controller operably connected with the sensing module and arranged to process the sensed signal to obtain a processed signal;

a communication module operably connected to at least one of the sensing module and the controller, arranged to communicate the sensed signal or the processed signal to the external movable device for controlling movement of the external movable device in accordance with the voluntary movement of the joint of the user; and a feedback module operably connected with the controller and arranged to provide haptic feedback to the user based on the received feedback signals when the flexible substrate is mounted to the user;

wherein the sensing module, the controller, the communication module, and the feedback module are arranged in or on the flexible substrate;

wherein the external movable device comprises any one of a robot, a teleoperated vehicle, a vehicle, an aircraft, and a surgical device.

19. The human-machine interaction device of claim 2, wherein each of the one or more sensors are mounted on different joints of the user, arranged for generating a sensed signal indicative of a full body movement of the user.

* * * * *